July 6, 1926.
W. J. BARGEN ET AL
COMBINED DESK AND SEAT
Filed Oct. 27, 1924
1,591,651
4 Sheets-Sheet 1
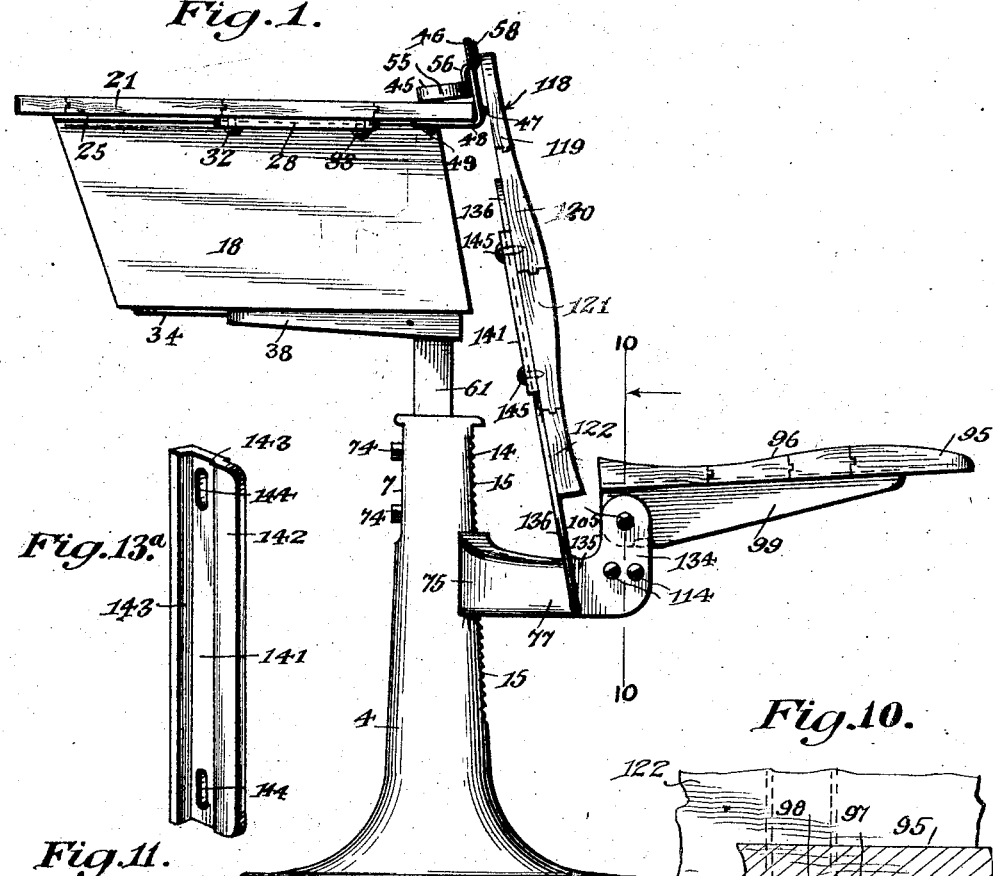
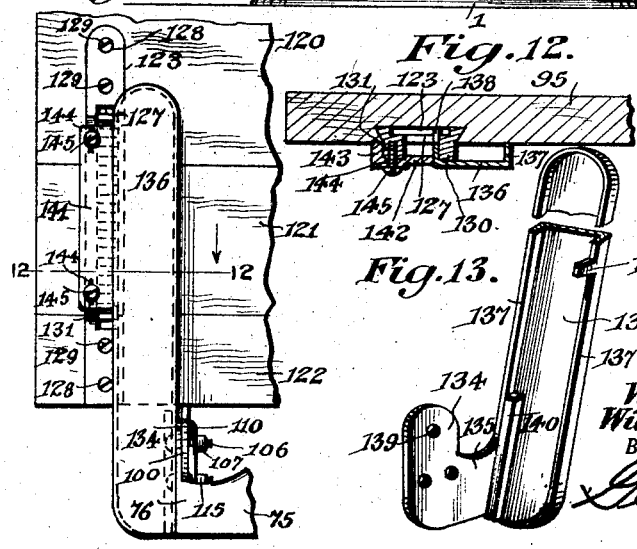
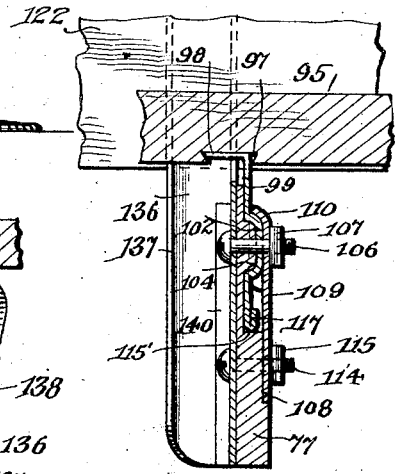
INVENTORS
William J. Bargen
William R. Brennan,
BY
Geo. P. Kimmel.
ATTORNEY.

July 6, 1926.
W. J. BARGEN ET AL
1,591,651
COMBINED DESK AND SEAT
Filed Oct. 27, 1924
4 Sheets-Sheet 2
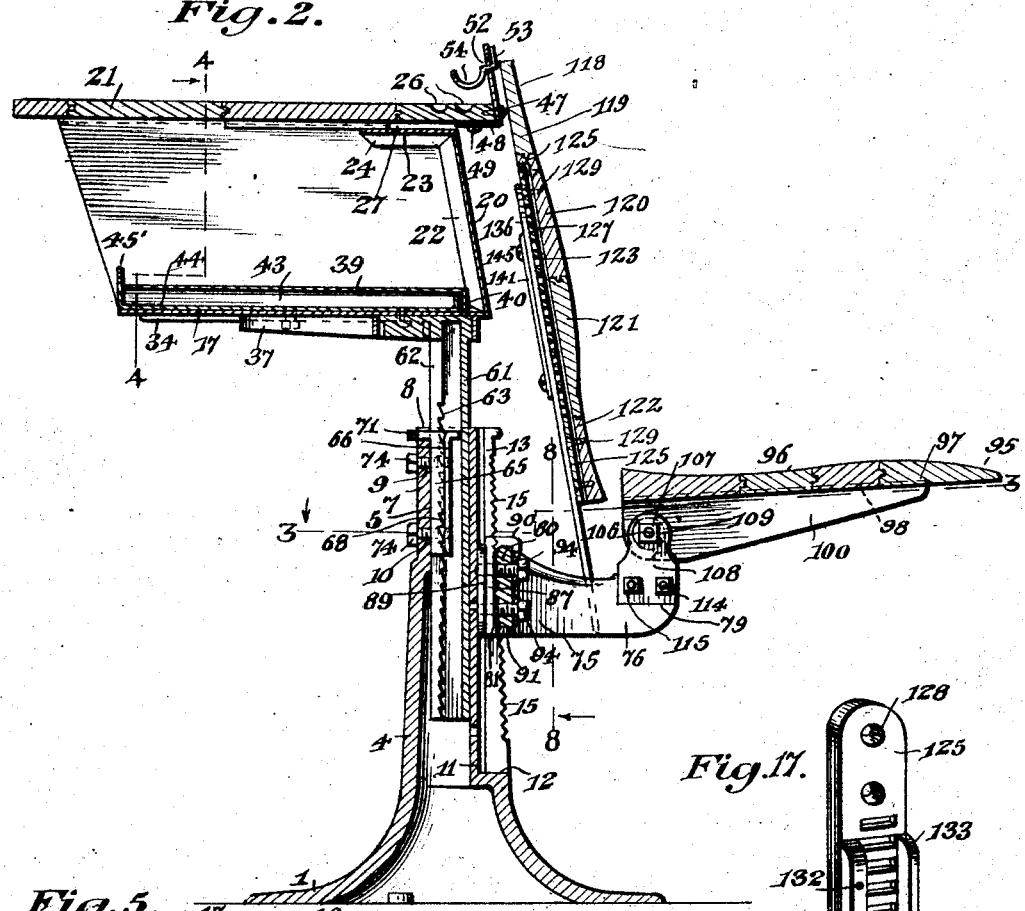
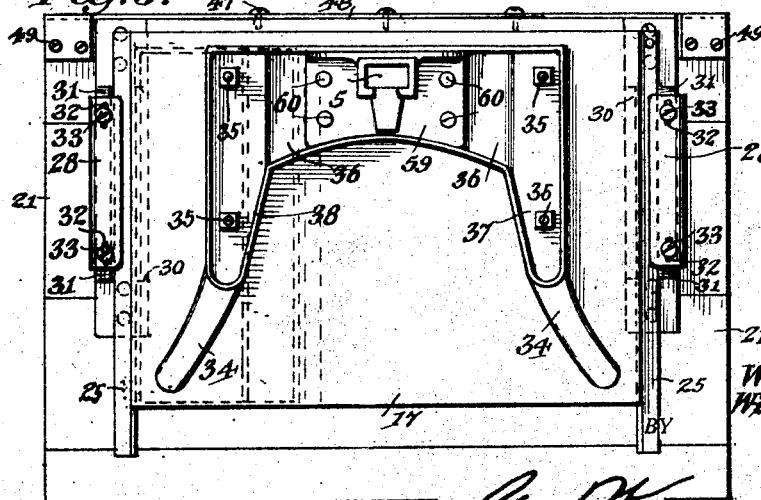
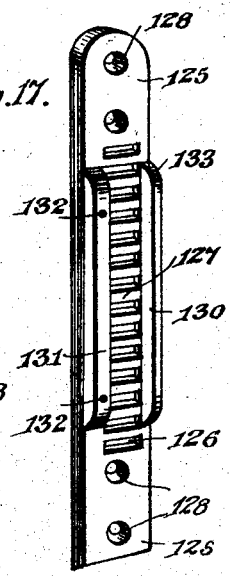
INVENTORS
William J. Bargen
William R. Brennan
Geo. F. Kimmel
ATTORNEY.

July 6, 1926.
W. J. BARGEN ET AL
1,591,651
COMBINED DESK AND SEAT
Filed Oct. 27, 1924
4 Sheets-Sheet 3
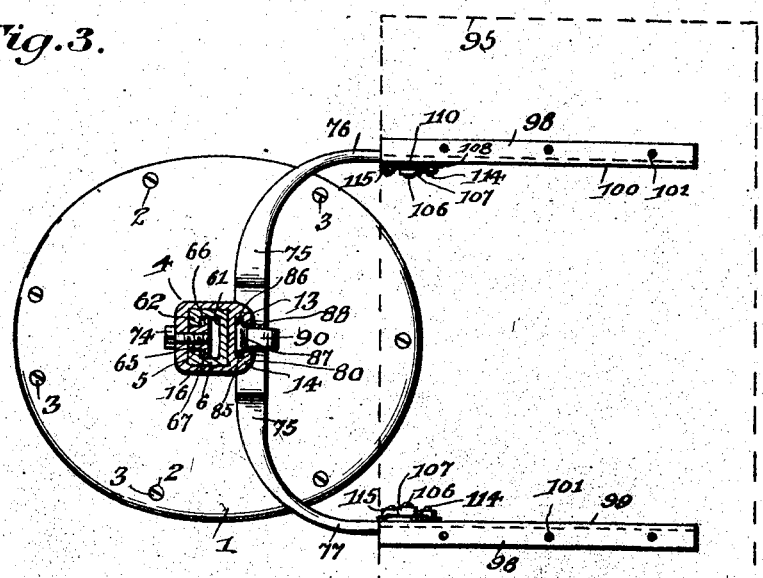
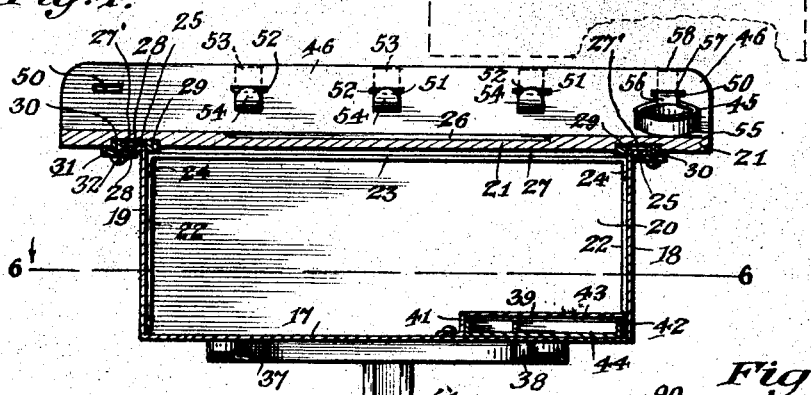
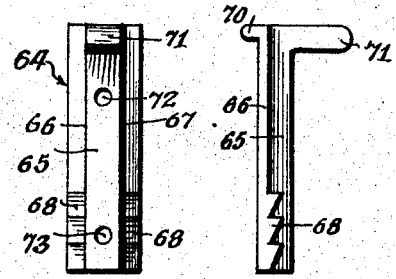
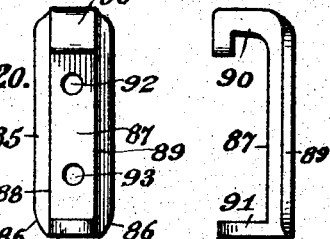
INVENTORS
William J. Bargen
William R. Brennan,
BY
Geo. F. Kimmel.
ATTORNEY.

July 6, 1926.
W. J. BARGEN ET AL
1,591,651
COMBINED DESK AND SEAT
Filed Oct. 27, 1924
4 Sheets-Sheet 4
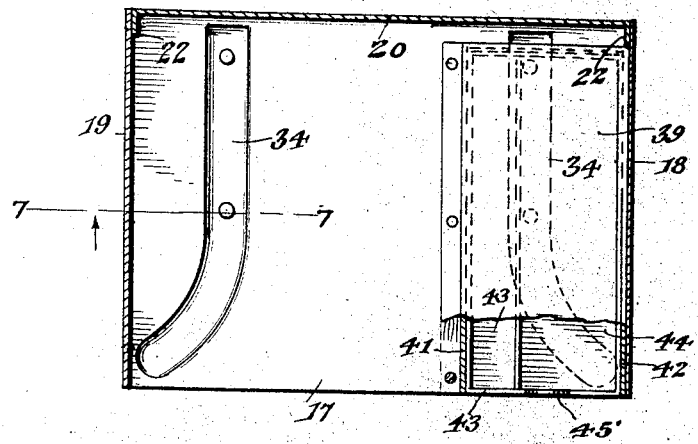
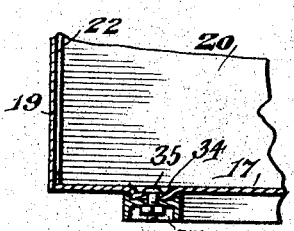
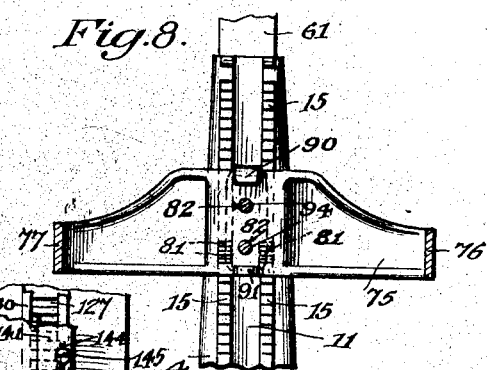
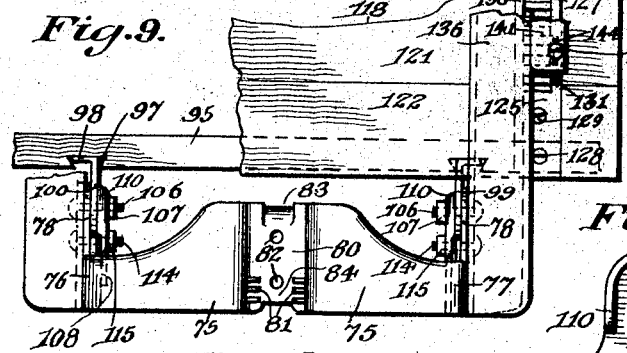
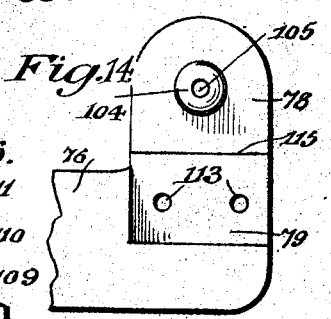
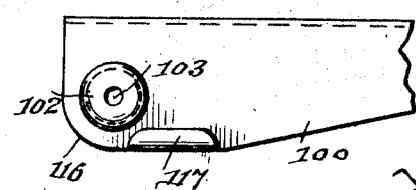
INVENTORS
William J. Bargen
William R. Brennan,
BY
Geo. P. Kimmel, ATTORNEY.

Patented July 6, 1926.

1,591,651

UNITED STATES PATENT OFFICE.

WILLIAM J. BARGEN AND WILLIAM R. BRENNAN, OF MISSOULA, MONTANA.

COMBINED DESK AND SEAT.

Application filed October 27, 1924. Serial No. 746,066.

This invention relates to furniture, such as a combined desk and seat for use in school and lecture rooms, but it is to be understood that an article of furniture, in accordance with this invention, can be employed or used for any purposes for which it is found applicable, and the invention has for its primary object to provide, in a manner as hereinafter set forth, an article of furniture provided with means whereby when it is used it can be adjusted to afford maximum amount of comfort with respect to the disposition of the user's arms, feet and legs.

A further object of the invention is to provide, in a manner as hereinafter set forth, an article of furniture, such as a combined desk and seat and with the desk independently adjustable with respect to the seat and the seat capable of being independently adjusted with respect to the desk, thereby providing for the article of furniture to be used by pupils or scholars of various heights, and further, whereby the seat back is capable of being vertically adjusted relative to the seat or to the desk body, so that the seat back can be arranged at the necessary position to insure comfort to the pupil or scholar when using the seat.

A further object of the invention is to provide, in a manner as hereinafter set forth, an article of furniture, such as a combined desk and seat for use in school rooms and with said article including a desk, seat back and seat, each independently adjustable with respect to the other, thereby providing for scientifically seating a pupil or scholar from a health standpoint, and whereby the setting up of the article with seat, back and desk independently adjustable with respect to each other enables the providing of an article of furniture which permits the use of one set of elements so that at no time need the purchasing committee of the school find itself long on one size of seats or short on another, but will find itself buying seating and desk elements economically, and furthermore in the providing of an article of furniture which, through the manner of setting up the various elements and the assembling thereof, permits their interchanging to such an extent that any one of the three kinds of seats employed in school rooms, such as front, regular and rear, can be set up from one structure.

A further object of the invention is to provide, in a manner as hereinafter set forth, an article of furniture, such as a combined desk and seat, having means as a part thereof to constitute a pen, pencil and ruler rack and an ink well or bottle holder.

A further object of the invention is to provide, in a manner as hereinafter set forth, an article of furniture, such as a combined desk and seat, and with the bottom of the body portion of the desk provided with a pen and pencil box in convenient reach of the pupil and with said bottom constructed to slidably support and frictionally secure said box from accidental displacement.

A further object of the invention is to provide, in a manner as hereinafter set forth, an article of furniture, such as a combined desk and seat and a supporting standard for the desk body, and further with new and novel means for not only fixedly securing the standard to the bottom of the desk body, but also for reinforcing said bottom.

A further object of the invention is to provide, in a manner as hereinafter set forth, an article of furniture including a vertically adjustable desk and with the desk body having the front wall thereof so constructed to provide for the circulation of air through said body.

A further object of the invention is to provide, in a manner as hereinafter set forth, an article of furniture including a desk body supporting standard telescoping within a pedestal and further with new and novel means to permit of readily adjusting the standard and the securing of it in adjusted position.

A further object of the invention is to provide, in a manner as hereinafter set forth, an article of furniture, such as a combined desk and seat, and including a pedestal and a seat supporting bracket, and further with new and novel means to permit of readily adjusting the bracket and the securing of it in adjusted position.

Further objects of the invention are to provide, in a manner as hereinafter set forth, an article of furniture, such as a combined desk and seat, which is simple in its construction and arrangement, having an adjustable desk body, seat and seat back and with each independently adjustable with respect to the other, strong, durable, compact, readily adjustable, thoroughly efficient and convenient in its use, quickly assembled and disassembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of an article of furniture, such as a combined desk and seat, in accordance with this invention.

Figure 2 is a vertical longitudinal sectional view thereof.

Figure 3 is a section on line 3—3, Figure 2.

Figure 4 is a section on line 4—4, Figure 2.

Figure 5 is an inverted plan of the desk element.

Figure 6 is a section on line 6—6, Figure 4.

Figure 7 is a section on line 7—7, Figure 6.

Figure 8 is a section on line 8—8, Figure 2.

Figure 9 is a fragmentary view, in rear elevation, of the seat supporting bracket, seat member and seat back.

Figure 10 is a section on line 10—10, Figure 1.

Figure 11 is a fragmentary view, in rear elevation, of the seat back and its adjustable supporting means.

Figure 12 is a section on line 12—12, Figure 11.

Figure 13 is a fragmentary view, in perspective, of one of the supports for the seat back.

Figure 13ª is a perspective view of one of the clamping members for the seat bracket.

Figure 14 is a fragmentary view, in rear elevation, of the outer end of an arm of the seat member supporting bracket.

Figure 15 is a fragmentary view, in rear elevation, of one of the seat member supports.

Figure 16 is an elevation of a retaining member for a seat member support.

Figure 17 is a perspective view of one of the rack bars carried by the seat back.

Figure 18 is a front elevation and Figure 19 a side elevation of the locking member for the supporting standard of the desk element.

Figure 20 is a rear elevation and Figure 21 a side elevation of the binding member for the seat supporting bracket.

A combined desk and seat, in accordance with this invention, comprises a pedestal, a desk element, a vertically adjustable supporting standard therefor, a locking mechanism for said standard, a vertically adjustable seat supporting bracket, a hinged seat member, a locking mechanism for said seat bracket, a vertically adjustable seat back, a locking mechanism for said seat back, an adjustable and movable desk top and locking mechanism for said desk top, a pen and pencil box forming a part of the desk element, a pen, pencil and ruler rack detachably connected with the desk element, and an ink well or bottle holder removably connected to the desk element.

The pedestal is constructed from a hollow casting and includes a base 1, provided with openings 2 for the passage of hold-fast devices 3, to fixedly secure the pedestal to a suitable support. The pedestal further includes a shank 4, which is of tapered contour, having the upper terminal portion 5 thereof formed to provide a polygonal-shaped passage 6 of non-tapered contour. The rear of the upper terminal portion 5 is inset and flattened, as indicated at 7. The upper egde of the terminal portion 5, centrally of the rear thereof, is notched, as at 8, and below said notch 8 is the flattened portion 7 is provided with a pair of superposed spaced openings 9, 10.

The front of the shank 4 is flattened, as at 11, for a substantial portion of its length and with said flattened portion extending from the top edge of the pedestal. The said flattened portion 11, at its lower end, terminates in a forwardly directed shoulder 12. Formed integral with the front of the shank 4 and extending from the top thereof to the shoulder 12, is a pair of lengthwise extending and forwardly directed oppositely disposed spaced flanges 13, 14, and each of which is angle-shaped in cross section. See Figure 3. The horizontal leg of each of the flanges, which is spaced from the shank 4 by the vertical leg of the flange, gradually increases in width from the top to the bottom thereof, and the outer face of said horizontal leg is toothed, as at 15. The flanges 13 and 14, in connection with the flat portion 11, form the front of the shank 4 with a vertically disposed T-shaped pocket 16, extending from the top of the shank 4 to the shoulder 12. The teeth 15 on the flanges 13, 14, provide a pair of racks and form elements of the locking mechanism for the seat supporting bracket and such locking mechanism will be hereinafter referred to.

The desk element comprises a body portion consisting of a bottom 17, a pair of side walls 18, 19, a flanged front wall 20, and a top 21. The front 20 is of less height than the side walls 18, 19. The bottom 17, side walls 18, 19 and front wall 20 are formed from a single piece of sheet metal bent to provide the configuration shown in Figures 1, 2 and 4, and with the front wall provided with a pair of side flanges 22 and an angle-shaped top flange formed of a horizontally disposed portion 23 and a pair of depending portions 24. The portion 23 is of a width materially greater than the flanges 22. The flanges 22 and the depending portions 24 are welded to the inner face of the walls 18, 19. The portion 23 is positioned below the upper ends of the walls 18, 19, and each of these latter, at its upper end, is provided with an outwardly directed right angularly disposed flange 25. The walls 18 and 19 decrease slightly in height rearwardly so that when the top 21 is mounted in position it will slightly incline from front to rear.

The top 21 is of greater length and width than the bottom 17, so that when the top is mounted in position it will project forwardly from the front wall 20 and rearwardly and laterally with respect to the side walls 18, 19. The top 21 is constructed from interengaging wooden slabs, see Figure 2, and the forward slab is provided with lengthwise extending grooves 26, which terminate at a point removed from each end of the slab and said grooves are adapted to receive pens or pencils. The top 21 is detachably connected with the side walls 18 and 19 for adjustment purposes, and when secured in position is spaced from the portions 23 to provide an air passage 27. See Figure 4. By this arrangement circulation of air is had through the body portion of the desk element.

For convenience of adjustment, the top 21 is detachably connected to the flanges 25 of the side walls 18, 19, and for such purpose the lower face of the top 21 is provided with a pair of spaced horizontally disposed grooves 27', and in each of said grooves 27' is secured a channel-shaped member 28 of inverted contour, and with the sides 29, 30 of said member of greater thickness than the top thereof. The width of each of said members 28 is such as to overlap the flange 25 and with the side 29 seating on the portion 23. The side 30 is arranged against the outer edge of a flange 25. See Figure 4. Positioned against each flange 25 and overlapping the side 30 of a member 28 is a flanged coupling member 31 provided with slots 32 for the passage of retaining screws 33, which engage in the side 30 of the member 28. See Figure 4. By this arrangement it does not require the passing of hold-fast devices through the top 21 for the purpose of securing it in position, whereby the top 21 is formed with a smooth upper face. The grooves 27 in the lower faces of the top 21 are of less depth than the height of the sides 29 and 30 of the member 28, so that said sides will depend from the lower face of the top 21. See Figure 4.

The bottom 17 is swaged to provide a pair of depending curved oppositely extending ribs 34 for reinforcing purposes and to further form grooves in the upper face of the bottom to receive the upper ends of hold-fast devices 35 for a combined bottom reinforcing and standard coupling bracket. By this arrangement, the heads of the hold-fast devices 35 are arranged below the plane of the upper face of the bottom 17 to prevent said upper ends interfering with the insertion of books or other articles in the desk body. The combined bottom reinforcing and coupling bracket, best shown in Figure 5, consists of a plate 36 formed with a pair of rearwardly extending projections 37 at the ends thereof. Depending from the edges of the plate 36 and projections 37 is a continuous flange 38. The hold-fast devices 35 are arranged at each forward corner of the plate 36 and intermediate the ends of each of the projections 37, and each of said devices consists of a headed bolt provided with a securing nut on the lower end thereof. The heads of the bolts are arranged in the grooves formed by the ribs 34, and the nuts abut against the lower face of the plate 36 and projections 37, and by this arrangement the bracket is fixedly secured to the lower face of the bottom 17. The flange 37 gradually decreases in height rearwardly.

Secured to the upper face of the bottom 1, at one side thereof, by welding or otherwise, is a compartment forming member consisting of a sheet of thin metal 39, flanged as at 40, 41 and 42, and with said flanges not only secured to the bottom 17, but also to the wall 18. The flanges 40, 41 and 42 space the major portion of the sheet or plate 39 from the bottom 17, thereby providing a pencil box compartment 43. Slidably mounted in the compartment 43, as well as frictionally engaging with the flanges 41, 42, is a pencil box 44, having its outer end provided with a handle member 45 to facilitate the removal and insertion of the box when occasion requires. The box 44 is of less length than the width of the bottom 17, but is of a length to extend in close proximity to a flange 22.

The pen, pencil and ruler rack, as well as the ink well or bottle holder is arranged at the forward end of the top 21 of the desk element and further are carried by an upright support consisting of a substantially narrow strip 45 of sheet metal having rounded corners 46. The strip 45 is positioned against the forward edge of the top 21, as well as secured to said edge by the holdfast devices 47. The forward edge of the top 21 is rearwardly bevelled, so that when the strip 45 is secured thereto it will extend upwardly and at a rear inclination. Each end of the strip 45, at the bottom thereof, is formed with a rearwardly directed flange 48, which is positioned against the lower face of the top 21 and also secured to said top 21 by hold-fast devices 49. The strip 45, in proximity to the top thereof, is formed with a lengthwise extending row of spaced rectangular slots. The outer slots of said row are indicated at 50, and the intermediate slots at 51. The pen, pencil and ruler rack is formed from a series of rack members constructed from a short strap of metallic material consisting of a horizontally disposed intermediate portion 52, a vertically disposed forward portion 53, and a semicircular rear portion 54 of greater length than the intermediate or forward portions 52, 53 respectively. The rack members are extended through the slots 51 in a manner whereby the intermediate portions 52 will be supported on the bottom walls of the slots 51 and the forward portions 53 will abut against the forward face of the strip 45. See Figure 2.

But one ink well or bottle holder is shown extended through one of the slots 50. Preferably, but one is employed, but if the pupils desire the use of two holders, then both slots 50 are employed. The holder is formed of a band-like body portion 55, standing on edge, having a shank formed integral with and projecting upwardly from the rear thereof. The shank consists of a vertically disposed lower portion 56, an intermediate portion 57 and an upper portion 58. See Figure 5. The intermediate portion 57 is seated upon the bottom wall of the slot 50 and the upper portion 58 bears against the forward face of the strip 45. The rack members and holder are removably mounted in the slots of the strip 45.

The vertically adjustable supporting standard for the desk element comprises a flanged head plate 59, fixedly secured by the hold-fast devices 60 to the plate 36. The head plate 59 abuts against the flange 38, centrally of the front and rear thereof, and formed integral with the head plate 59, as well as depending therefrom, is a hollow stem 61, which is yoke-shaped in cross section and has the free end of each of its sides formed with an inwardly extending lengthwise disposed flange 62. The flanges 62 extend towards and are spaced a substantial distance from each other, and the inner face of each of said flanges 62 is formed with lengthwise extending ratchet teeth 63 to provide a rack. The shape of the stem 61 corresponds in contour to the polygonal-shaped passage 6, and said stem 61 is vertically adjustable within the pedestal, and associating with said stem is a locking mechanism for maintaining it in adjusted position. The racks formed by the teeth 63 are elements of the locking mechanism and the latter will be presently referred to.

The locking mechanism for the stem 61, see Figures 2, 3, 18 and 19, not only includes the racks formed by the teeth 63, but further includes a locking member consisting of a rectangular body portion 64 formed on its rear face with a centrally disposed enlargement 65, which extends from one end to the other end of the body portion 64 and forms a pair of shoulders 66, 67. The body portion 64, at the lower part of its rear face, at each side of the enlargement 65, is formed with a plurality of ratchet teeth 68, which coact with the racks formed by the teeth 63 for locking the stem 61 in its vertically adjusted position. The body portion 64, centrally of its front face, at the top thereof, is formed with a right angularly disposed lug 70 capable of abutting against the inner face of the front of the stem 61 to arrest forward shifting of the locking member when released. The enlargement 65, at its upper end, has formed integral therewith, a rearwardly extending and right angularly disposed supporting lug 71, which seats in the notch 8, see Figure 2, and provides means for manually shifting the locking member forwardly when the latter is released. The locking member, centrally thereof, is formed with a pair of spaced openings 72, 73, extending through the enlargement 65. The opening 72 is arranged between the transverse center and the top of the body portion 64, and the opening 73 is positioned between the transverse center and the bottom of the body portion 64. The walls of the openings 72 and 73 are threaded and engaging with said walls are clamping screws 74, one extending through the slot 9 and engaging the wall of the opening 72, and the other extending through the slot 10 and engaging the wall of the opening 73.

With respect to the locking mechanism referred to, it will be assumed that the stem 61 is in the position shown in Figures 2 and 3 and with the locking member engaging with the teeth 63 and extending between the flanges 62 and abutting against the inner face of the rear of the pedestal. The locking member is retained in such position by the clamping screws 74. The lowering of the locking member is arrested by the lug 71 extending through and seating in the notch 8. The lower screw 74 is loosened freely and the upper one less freely, and when the clamping screws have been loosened in the manner as stated, the stem can be moved up freely. If it is desired to lower the stem 61, the lower clamping screw 74 is pushed inwardly so that the teeth 68 will clear the teeth 63. After the stem 61 has been adjusted upwardly or downwardly to the position desired, the clamping screws are then adjusted to cause the locking member to bind against the teeth 63 and also against the pedestal, and the locking member will then be positioned to maintain the stem 61 in the position to which it has been adjusted.

The supporting bracket for the seat member and seat back is formed from a single casting and consists of a body portion 75 terminating in a pair of forwardly directed arms 76, 77, and each of the latter has its free end provided with a vertically disposed extension 78 of less thickness than the thickness of the arm, and below said extension 78 the inner face of the arm is mortised, as at 79. The rear face of the body portion 75, centrally thereof, is formed with a vertically disposed groove 80, and projecting inwardly from each side wall of the groove 80, as well as being formed integral therewith and with the bottom of said groove 80 is a plurality of teeth 81. Each of the teeth 81 is of a length as to terminate to one side of the vertical median of the body portion 75, at the center thereof. The body portion 75, at the vertical median of the center thereof, is formed with a pair of spaced openings 82, which communicate with the groove 80. The top edge of the body portion 75, centrally of its front, is formed with a notch 83, with the bottom thereof rounded, and said notch opens into the groove 80. The bottom edge of the body portion 75, centrally thereof, is notched, as at 84, and the side walls thereof are rounded. The side walls of the grooves 80 are rounded.

The supporting bracket for the seat member and seat back is vertically adjusted on the flanges 13 and 14 of the pedestal and a locking mechanism is employed for maintaining said bracket in its adjusted position. The said locking mechanism includes the teeth 15, as well as the teeth 81, and further includes a binder member, see Figures 3, 20 and 21. The binder member consists of a vertically disposed rectangular body portion 85, having the corners thereof rounded, as at 86. Formed integral with the forward face of the body portion 85 is an enlargement 87, which extends from the top to the bottom of said body portion 85 and is arranged centrally thereof. The enlargement 87 forms a pair of shoulders 88, 89, and integral with the upper end of the enlargement 87, as well as projecting forwardly thereof, is an angle-shaped supporting lug 90. Formed integral with the lower end of the enlargement 87 and projecting forwardly thereof and at right angles with respect thereto, is a lug 91. The lug 90, when the binder member is in position, extends between the flanges 13, 14, also through the notch 83 and overlaps the front of the body portion 75 of the supporting bracket. See Figure 3. The lug 81 extends between the flanges 13 and 14 and through the notch 84. See Figure 2.

The binder member, centrally thereof, is formed with a pair of spaced openings 92, 93, having threaded walls, and which register with the openings 82 formed in the body portion 75. The groove 88 is of a width to overlap the flanges 13 and 14 when the supporting bracket is mounted in position. See Figure 3. The supporting bracket carries the binder member and when said bracket is mounted in position, the body portion 86 of the binder member, as well as an enlargement 87 thereof, is arranged in the pocket formed by the flanges 13, 14. The body portion 86 is positioned between the horizontal legs of the flanges and the flattened portion 11, and the enlargement 87 extends between the horizontal legs of the flanges 13, 14. The lugs 90 and 91 project over the top and bottom edges of the body portion 75. See Figures 3 and 8.

The binder member is secured in position for the purpose of maintaining the teeth 81 in engagement with certain of the teeth 15 of the flanges 13 and 14 through the medium of a pair of clamping screws 94, one of which extends through an opening 82 and has threaded engagement with the wall of the opening 92, and the other of which extends through the other opening 82 and has threaded engagement with the wall of the opening 93. When the binder member is secured in position by the clamping screws 94, the teeth 81 are held in engagement with certain of the teeth 15 and which maintain the supporting bracket in the position to which it was adjusted.

To release the locking mechanism for the seat supporting bracket, the lower clamping screw 94 is loosened freely and the upper one a few turns, after which the bracket can be lowered and raised on the hinge principle, a slight raise of the entire bracket and it moves freely. Drop the entire bracket and it locks automatically.

The seat includes a hinged seat member and a vertically adjustable back and which are carried by the vertically adjustable seat supporting bracket, and the seat member which is indicated at 95 is rectangular in contour, formed from a series of interengaging wooden slabs and having its upper face of compound curvature, as at 96. The lower face of the seat member is formed with a pair of transversely extending spaced grooves 97 of a length less than the width of the seat member, and seating in said grooves, as well as being secured therewith by suitable hold-fast devices, are the flanges 98 of a pair of seat member supports. One of said supports is indicated at 99 and the other at 100. The openings in the flanges 98 for the passage of the hold-fast devices to secure the seat member to the flanges 98, are indicated at 101.

The means for hinging the seat member 95 to the arms 76, 77 of the adjustable supporting bracket consists in providing each seat member support at the rear end thereof with an offset circular portion 102, which extends inwardly and forms a circular socket opening at the outer face of the seat member support. The offset portion 102 is formed centrally with an opening 103. Extending into the socket formed by the offset portion 102 is a circular enlargement 104, formed on the inner face of an extension 78. See Figure 14. The extension 78 is provided with an opening 105, centrally of the enlargement 104, and which registers with the opening 103. The wall of the socket formed by the offset portion 102, in connection with the edge of the enlargement 104 coacts to form a hinge or pivot between a seat member support and one of the arms of the adjustable seat supporting bracket. Extending through the aligning openings 103 and 105 is a connecting bolt 106, carrying a securing nut 107 on its inner end.

The seat member supports are positioned between the extensions 78, see Figure 9, and when the seat member is set up the weight thereof is carried by the enlargements 104 and is withheld by said enlargements from off the bolts 106. Mounted in the mortises 79 are coupling plates, each consisting of a rectangular body portion 108, a vertical arm 109, and a curved flange 110 extending around the edges of the arm 109. When the coupling plates are mounted in position, the flanges 110 overlap the enlargements 102 and said flanges 110 constitute what may be termed a bearing for said enlargements. The arms 109 are provided with openings 111, through which extend the bolts 106, and the body portion 108 of each of the coupling plates is formed with openings 112, which register with openings 113 formed in an arm 76 or 77, and extending through the registering openings 112, 113 are connecting bolts 114, carrying securing nuts 115. The extensions 78 have their outer faces flush with the outer faces of the arms 76 and 77, and as the extensions 78 are of less thickness than the thickness of said arms, shoulders 115' are provided, which constitute stops for the elevating and lowering movement of the seat supporting members, and these latter at their rear lower corners are rounded, as at 116, to provide clearances when the member is elevated and lowered. Each of the seat member supports, at the rear portion of its lower edge, is provided with a reinforcement 117, which seats on the shoulders 115' when the seat member is in lowered position.

The seat back, which is vertically adjustable, independently of the adjustment of the seat supporting bracket, is rectangular in contour and formed of a series of interengaging wooden slabs, preferably four in number. The seat back is referred to generally by the reference character 118, and the wooden slabs which form said seat back are indicated at 119, 120, 121 and 122. The slab 118 is of less thickness than the slab 122. The rear faces of the slabs are plane and the outer faces curved. The curvature of the outer face of the slab 118 is such that said slab will gradually increase in thickness towards the slab 120. The curvature of the outer face of the slab 120 is such that the slab will gradually increase in thickness towards the slab 121. The curvature of the outer face of the slab 121 is such that it will gradually decrease in thickness from the slab 120 towards the slab 122. The curvature of the outer face of the slab 122 is such whereby said slab will gradually decrease in thickness towards its longitudinal center and then increase in thickness towards its lower edge. By this construction the seat back has its outer face gradually decreasing in thickness in a direction from its longitudinal center towards its top and bottom edges. The curvature of the outer face of the seat back is such as to cause the back of the pupil to rest thereagainst in comfort.

The rear face of the seat back is formed with a pair of transversely extending spaced grooves 123, of a length to extend from a point removed from the top edge of the seat back and terminate at the lower edge thereof. Secured in each of the grooves 123 is a rack bar 124. Each of the rack bars, best shown in Figure 17, consists of a substantially elongated narrow body portion 125 formed of metallic material and provided intermediate its ends with a series of transversely extending spaced openings 126 forming a rack 127. Arranged above and below the rack 127 are openings 128 for the passage of hold-fast devices 129 to secure the body portion 125 to the seat back. Formed integral with the outer face of the body portion 125, at each side of the rack 127, is a longitudinally extending rib. The ribs are indicated at 130 and 131, and the latter is of greater thickness than the former and provided with a pair of sockets 132, each having the wall thereof threaded. Each end of each of the ribs 130, 131, is rounded, as at 133. The ribs 130, 131 are of less length than the length of the rack 127, and the latter projects from each of the ends of said ribs. The grooves 123 are of the dovetail type and in cross section the body portion 125 conforms in contour to the shape of the groove. See Figure 12.

The connecting bolts 114, not only provide means for securing the coupling plates to the arms of the adjustable seat supporting bracket, but also provide means for securing a pair of upright seat back supports to said bracket. The connecting bolts 106 also act to secure the seat back support to the seat supporting bracket. Each of the seat back supports consists of an angle-shaped arm and with one of the legs thereof vertically disposed and indicated at 134, and its other leg, which is disposed horizontally, is indicated at 135. The leg 135 extends rearwardly and is formed integral with an upwardly extending rearwardly inclined standard 136, provided at its top, sides and bottom with a forwardly directed flange 137. One of the side portions of the flange 137, intermediate the ends thereof, is formed with a forwardly directed holding lug 138, engageable in the rack 127 for the purpose of positioning the seat back and retaining it in such position. The seat back is arranged against the flange 137 and with that side of the flange 137 provided with the lug 138 overlapping the rib 130. See Figure 11. The arm, at the lower end of the support, is arranged against the outer face of an arm 76 or 77, and the vertical leg 134 is provided with openings 139 for the passage of the connecting bolts 106 and 114.

Formed integral with the standard 136, as well as the arm 135, is a combined reinforcing and stop piece 140, which is arranged in alignment with the rib 131. The standard 136 is secured in its adjusted position, with respect to the rack 127, by a clamping member consisting of a rectangular body portion 141, which is offset, as at 142, thereby providing a shoulder 143. The body portion 141, opposite the offset part 142, is provided with a right angularly disposed flange 143. The body portion 141, near its upper end and near its lower end, is formed with a lengthwise extending slot 144. The clamping member referred to is best shown in Figure 13ª. When in clamping position, the said member is seated against the rib 131 and with the flange 142 positioned against the outer face of the rib 131. The offset portion 142 bears against that side of the flange 137 of the standard 136, which is formed with the flange 138 and clamps said side of said flange 137 against the inner face of the rib 130. The clamping member is detachably secured in position by hold-fast devices 145, which engage in the sockets 132. The manner in which the clamping member is secured in position to retain the seat back when adjusted, is best shown in Figure 12. When the clamping member is released, the seat back can be shifted to the desired position and then secured stationary in the manner as referred to.

An article of furniture, in accordance with this invention, provides means for bodily vertically adjusting a seat, which includes a seat member and an independently adjustable back, means for independently adjusting a desk element with respect to the seat, means whereby the desk top can be slid forward and backward to accommodate any student after the other independent adjustments have been made, and further includes means whereby the seat back can be vertically adjusted independently of the desk element or the seat supporting bracket.

An article of furniture, in accordance with this invention, not only includes means to provide a removable pen, pencil and ruler rack, but also a removable ink well or bottle holder, and furthermore provides the body of the desk element with means to retain or removably secure a pencil and pen box to the bottom of the body of the desk element, and it is thought that the many advantages of an article of furniture for school room purposes, constructed in accordance with this invention, can be readily understood, and although the preferred embodiment of the invention is as illustrated and described, yet changes in the details of construction can be had which will fall within the scope of the invention as claimed.

What we claim is:—

1. An article of furniture for the purpose set forth comprising a pedestal, a desk, a vertically adjustable slotted hollow supporting standard secured to the desk and extending into said pedestal, said standard having inwardly arranged teeth, a toothed locking member extending through the slot of the standard and coacting with the teeth of the standard, said member supported at one end from said pedestal, and releasable means carried by the latter and engaging in said member for securing the same in locking position to hold the standard when in adjusted position.

2. An article of furniture for the purpose set forth comprising a pedestal, a desk, a vertically adjustable slotted hollow supporting standard secured to the desk and extending into said pedestal, said standard having teeth on its inner face, a toothed locking member extending through the slot of the standard and coacting with the teeth of the standard to support the same, said member suspended from said pedestal, releasable means carried by the latter and engaging in said member for securing the same in locking position to hold the standard when adjusted, and said member having means binding against the inner face of the standard when the member is in locking position.

3. An article of furniture for the purpose set forth comprising a pedestal, a desk, a vertically adjustable hollow supporting standard therefor, means suspended from the pedestal and extending in and having toothed engagement with the standard and further binding against the inner face of the latter for detachably securing the standard in adjusted position, and releasable binder elements carried by the pedestal and engaging in said means for securing the same from movement.

4. An article of furniture for the purpose set forth comprising a pedestal, a desk, a vertically adjustable hollow supporting standard therefor, means supported from the pedestal and extending in and having toothed engagement with the inner face of the standard for detachably securing the standard in adjusted position, and releasable elements carried by the pedestal and engaging in said means for securing the same from movement.

5. An article of furniture for the purpose set forth comprising a hollow pedestal, a desk, a vertically adjustable hollow supporting standard therefor, said standard extending into said pedestal, means suspended from the top of the pedestal and extending into and having binding engagement with the inner face of the standard for securing the latter in adjusted position, and superposed releasable binder elements carried by the pedestal and engaging in said means for securing it in binding engagement with respect to the inner face of the standard.

6. An article of furniture for the purpose set forth comprising a hollow pedestal, a desk, a vertically adjustable hollow, slotted supporting standard therefor, said standard extending into said pedestal, means supported from the pedestal, arranged in the slot of the standard and further extending into the standard and having toothed engagement with the inner face of the latter for detachably securing the standard in adjusted position, and releasable binding elements carried by the pedestal and engaging in said means for binding the same against the inner face of the standard.

In testimony whereof, we affix our signatures hereto.

WILLIAM J. BARGEN.
WILLIAM R. BRENNAN.